R. N. MARTZ.
VEHICLE.
APPLICATION FILED OCT. 29, 1906.
911,143.
Patented Feb. 2, 1909.
2 SHEETS—SHEET 1.
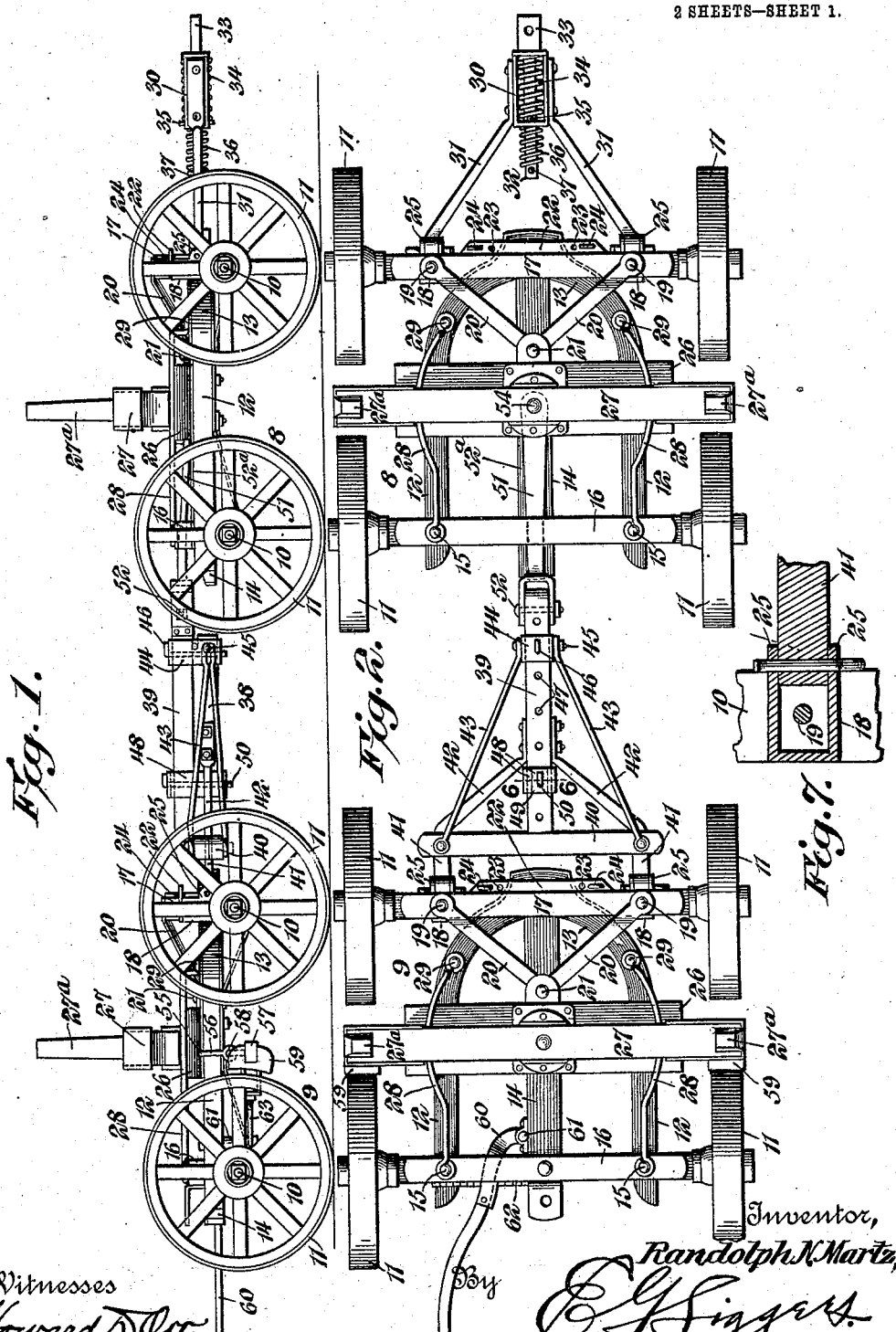

R. N. MARTZ.
VEHICLE.
APPLICATION FILED OCT. 29, 1906.
911,143.
Patented Feb. 2, 1909.
2 SHEETS—SHEET 2.
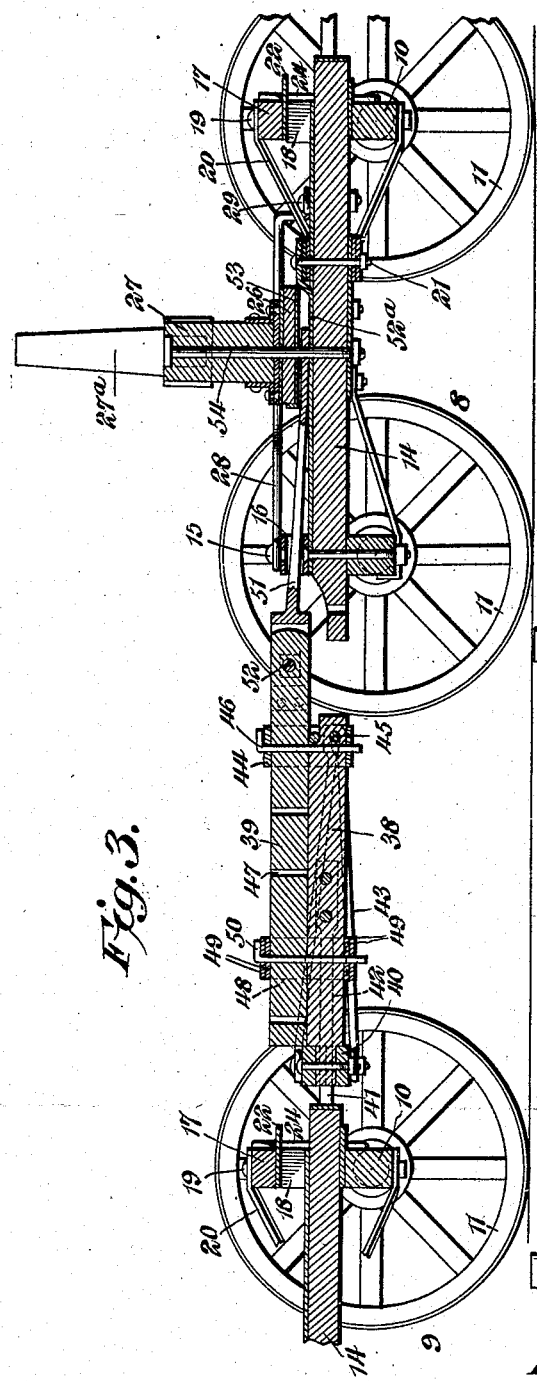
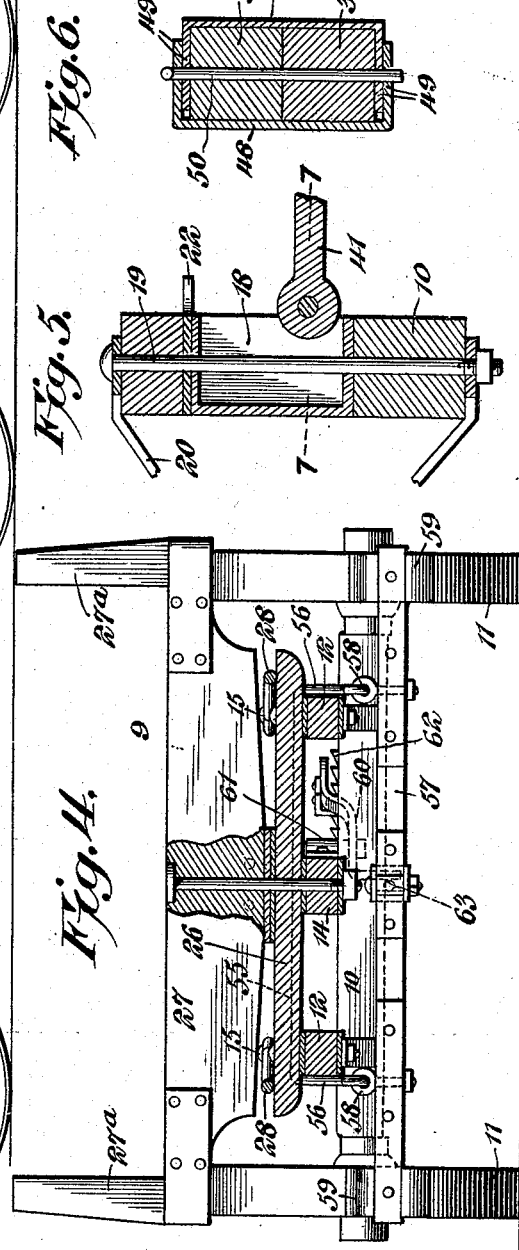
Witnesses
Howard D. Orr
B. G. Foster
Inventor,
Randolph N. Martz,
By
E. G. Siggers
Attorney

UNITED STATES PATENT OFFICE.

RANDOLPH N. MARTZ, OF FREDERICK, MARYLAND.

VEHICLE.

No. 911,143. Specification of Letters Patent. Patented Feb. 2, 1909.

Application filed October 29, 1906. Serial No. 341,114.

*To all whom it may concern:*

Be it known that I, RANDOLPH N. MARTZ, a citizen of the United States, residing at Frederick, in the county of Frederick and State of Maryland, have invented a new and useful Vehicle, of which the following is a specification.

This invention relates particularly to vehicles of the eight wheel type. In these structures, it is usual to employ front and rear trucks, having bolsters thereon, and to connect said trucks by a coupling or reach. This coupling or reach has heretofore been pivotally connected to the rear end of the front truck, and this arrangement has proven particularly objectionable, for the reason that when the front truck is turned with respect to the rear truck, the distance between the bolsters is shortened. The result is that said bolsters must slide beneath the load located thereon, or the bolster bolts will bend or break. It has been proposed to connect the bolsters by a coupling, but this also is objectionable, on account of preventing the free play of the bolsters with respect to the reach or coupling, and necessitates the employment of said bolsters in order to secure the proper connection between the trucks.

One of the principal objects of the invention is to provide a vehicle of the above described character, in which the coupling is so connected to the trucks that the turning of said trucks will effect no variation of distance between the bolsters, and consequently no shifting of the load will take place on the latter, said coupling or reach moreover being separate from the bolsters, so as to not interfere with their movement, and permitting the employment of the vehicle with or without them.

Another object is to provide a structure that is in the nature of an improvement on the vehicle disclosed in a former patent granted to me January 23, 1906, No. 810,492, though there are features undoubtedly useful in connection with other vehicles of this type.

The preferred embodiment of the invention will be understood from the accompanying drawings, in which:—

Figure 1 is a side elevation of the vehicle. Fig. 2 is a top plan view of the same. Fig. 3 is a vertical sectional view on an enlarged scale through the central portion of the vehicle. Fig. 4 is a cross sectional view through the rear truck. Fig. 5 is a detail sectional view through one of the standards that separate the front axles and axle bolsters. Fig. 6 is a cross sectional view on the lines 6—6 of Fig. 2. Fig. 7 is a horizontal sectional view on the line 7—7 of Fig. 5.

Similar reference numerals designate corresponding parts in all the figures of the drawing.

In the embodiment illustrated, the vehicle comprises front and rear trucks 8 and 9. As these trucks are substantially duplicates, a description of one is believed to be sufficient for both. Front and rear axles 10 are employed, on the ends of which are journaled front and rear sets of wheels 11. Secured to the rear axle, is a truck hound frame, comprising side bars 12 connected by a curved front portion 13, and a center bar 14. The side bars 12 and the center bar 14 are secured to the axle by means of bolts 15 passing therethrough, which bolts also pass through a rear axle bolster 16 disposed over the bars.

The front end of the frame is located upon the front axle, and is slidable thereon, while a front axle bolster 17 is located over said front axle, and over the front portion of the frame. This latter axle bolster is held in spaced relation to the front axle by means of hollow standards 18, which are maintained in position by bolts 19 passing therethrough and through the axle and axle bolster. The said bolts also serve to secure braces 20 that are convergently disposed, and are pivoted, as shown at 21 to the central bar 14 between the axles. Wear plates 22, disposed on opposite sides of the front end of the hound frame and secured to the front axle and axle bolster, project in advance of the same, and are provided with openings 23, in which holding pins 24 can be placed to limit the swinging movement of the front axle. The hollow standards 18, which support the front axle bolster 17, are provided with forwardly projecting spaced ears 25.

A bolster support, in the form of a beam 26 is located upon an intermediate portion of the frame, and is disposed transversely of the bars thereof, resting upon said bars and being suitably secured to the same. Upon this support is pivotally mounted a bolster 27 carrying suitable stakes 27ª at its ends. It will be observed that the bolsters of both trucks are not directly in the center of said trucks, but are nearer the rear wheels than the front wheels. In order to properly support the bolster throughout the limit of its movement, curved tracks 28 are employed, that are located over the side bars 12, their front ends being secured to said side bars, as shown at 29, their rear ends being fastened by the bolts 15, which pass through the rear axle bolster 16. So far as thus described, the trucks are duplicates, and consequently it will be apparent that the parts above described, are readily interchangeable, and are applicable to either truck.

The draft mechanism for the vehicle comprises an open boxing 30, secured between the front ends of divergently disposed links 31. The rear ends of these links are pivoted to and between the ears 25 of the standards of the front truck. In the boxing is slidably mounted a plunger 32, the front end of said plunger being formed, as shown at 33, to provide for the convenient attachment of a tongue or other draft means. Within the boxing and mounted on the plunger is a coiled spring 34, its front end bearing against the front end of the boxing, its rear end being borne against by a pin 35, carried by the plunger. Another spring 36 is located on the rear end of the plunger, and bears against the rear end of the boxing. A pin 37, carried by the rear end of the plunger, bears against the rear end of the spring. Thus a yielding draft member is provided, which will absorb all shocks and jars that would otherwise be transmitted between the vehicle and the draft animals or other means for moving said vehicle.

The coupling or reach between the trucks comprises a plurality of sections. A pair of slidably associated sections 38 and 39 are employed, the section 38 being connected at its rear end to a cross bar 40, having rearwardly extending ears 41 that are pivoted to and between the ears 25 of the standards of the rear truck. Braces 42 connect the ends of the cross bar 40, and an intermediate portion of the section 38. Other braces 43 are connected to the ends of the cross bar, and to a sleeve or cuff 44 that surrounds both sections 38 and 39. A horizontal transverse bolt 45 passes through the front ends of the braces 43 through the sleeve and the front end of the section 38, thus securing the parts together but permitting of the ready detachment of the braces 43 in case it is desired to introduce a section of a different length. An upright pin 46 passes downwardly through the sleeve and through both sections 38 and 39, thus serving to prevent the sliding movement of both sections, the pin being detachable, however, and arranged to be passed through any of a series of openings 47 in the section 39. Another sleeve or cuff surrounds both sections, and as illustrated in Fig. 6, comprises separate sections 48 having upper and lower overlapping ends 49 located above and below the sections. Another pin 50 passes through the overlapped ends, and through the sections 38 and 39, thus serving to further secure said sections against sliding movement, and yet permitting of their adjustment if desired, said pin constituting the sole means for securing the sleeve or cuff sections to the coupling or reach, as will be evident by reference to Figs. 3 and 6.

In addition to the sections 38 and 39, of the reach already described, a swinging section 51 is employed, which is connected to the section 39 by a horizontally disposed pivot bolt 52. The pivotal connection, is, as clearly illustrated in Figs. 2 and 3, disposed directly adjacent to the rear end of the front truck, and the section 51 extends over the center bar 14 to a point between said bar, and the front bolster supporting beam 26, as illustrated in Fig. 3. The upper side of the center bar is reinforced by a metallic strap 52ª, and the underside of the support 26 is provided with a suitable wear plate 53. The pivot bolt 54, which secures the front bolster 27 in place, passes through the front bolster support, through the front end of the swinging section 51 of the reach or coupling, and through the center bar 14, thus securely holding the parts in position, yet permitting the free movement of the bolster with respect to the reach and the bolster constituting no part of the means for securing the reach to the front truck, so that even if the bolster is removed, as is sometimes the case, the vehicle running gear is still complete.

A brake is mounted on the rear truck, and for this purpose, a rock shaft 55 is employed, which is disposed transversely of the center and side bars, beneath the rear bolster support, said rock shaft having depending arms 56. A brake beam 57 has pivot connections 58 with the arm 56, and is provided at its ends with brake shoes 59 coöperating with the rear wheels. A lever 60 is fulcrumed as shown at 61, on one side of the center bar 14, one arm of this lever coöperating with a rack 62 secured to the rear axle, the other arm having an adjustable link connection 63 with the brake beam.

Perhaps the most important feature of the invention is the connection between the trucks. As already stated and disclosed, the reach or coupling is pivoted to the front truck directly beneath the front bolster, and therefore no matter how much the front truck may be turned, the front bolster will remain the same distance away from the rear bolster, and there is no shifting of the load upon said bolsters, so that the objectionable consequences due to said shifting are entirely obviated. At the same time, the movement of the front bolster is entirely independent of the reach or coupling, and the advantages therefor have already been fully set forth. Furthermore, the reach or coupling can be lengthened or shortened to suit the different requirements of use, and the relative up and down movements of the trucks is permitted. The specific construction of the reach permits of the insertion of sections of different lengths, and said reach is properly strengthened and braced. The advantage for placing the bolsters slightly in rear of the centers of the trucks resides in the fact that the weight and friction is more nearly equalized upon the wheels, causing lighter draft, since the front wheels make the tracks and on uneven ground encounter more resistance and strain in striking obstructions than the rear wheels. By employing the bolster supports, the frame is reinforced and the strain is better transmitted to the frame when the different wheels of the vehicle drop into ruts and the like. The tracks or guides are important, as they control the rocking motion of the bolster, especially when making short turns, and if the road is at all inclined.

From the foregoing, it is thought that the construction, operation, and many advantages of the herein described invention will be apparent to those skilled in the art without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a vehicle of the character described, the combination with a plurality of trucks, of a coupling connected to the rear truck, a bolster mounted on the front truck, said coupling extending beneath and being separate from the bolster, and having a sliding movement upon and transversely of the rear end of the front truck and a journal pin passing through the bolster, the coupling and the front truck.

2. In a vehicle of the character described, the combination with a plurality of trucks, of a coupling connected to the rear truck, and having an intermediate portion located at the rear end of the front truck and movable transversely thereof toward and from its rear wheels, a bolster mounted on the front truck, said coupling extending beneath and being separate from the bolster, and a pivot connection between the coupling and truck beneath said bolster.

3. In a vehicle of the character described, the combination with a plurality of trucks, of a bolster support on the front truck, a bolster mounted on the support, and a coupling connecting the trucks and pivoted to the front truck beneath the bolster support, said bolster having a free pivotal movement with respect to the coupling and said truck swinging from side to side with said pivot connection of the coupling as an axis.

4. In a vehicle of the character described, the combination with a plurality of trucks, of a bolster support on the front truck, a bolster mounted on the support, a coupling connecting the trucks and extending beneath the bolster support, and a journal pin passing through the bolster, the bolster support and the portion of the coupling located beneath the latter, said front truck swinging from side to side with the journal pin as an axis.

5. In a vehicle of the character described, the combination with front and rear trucks, the former having front and rear sets of wheels, of a coupling comprising front and rear sections, the rear section being connected to the rear truck and the front section being pivoted to an intermediate portion of the front truck between the front and rear sets of wheels, and a pivotal connection between the sections located between the trucks and permitting the vertical swinging movement of said sections.

6. In a vehicle of the character described, the combination with front and rear trucks, the former having front and rear sets of wheels, of a coupling comprising front and rear sections, the rear section being connected to the rear truck and the front section being pivoted to an intermediate portion of the front truck between the front and rear sets of wheels, and a horizontal pivotal connection between the sections, said pivotal connection being disposed directly adjacent to the rear end of the front truck, and permitting the vertical swinging movement of the sections.

7. In a vehicle of the character described, the combination with front and rear trucks, of a coupling comprising slidably associated sections, and another section pivotally connected to one of the slidably associated sections on a substantially horizontal axis, connections between the other of the slidably associated sections and the rear truck, and a pivot connecting the pivotal section to an intermediate portion of the front truck.

8. In a vehicle of the character described, the combination with front and rear trucks, of a coupling comprising slidably associated sections, one of said sections being connected to the rear truck, the other being connected to the front truck, a keeper sleeve surrounding and snugly receiving both coupling sections and comprising separate sections having upper and lower overlapping terminals respectively arranged above and below the coupling sections, and a holding pin passing through said terminals and through the sections of the coupling, said pin constituting the sole means for securing the sleeve sections together and to the coupling sections.

9. In a vehicle of the character described, the combination with front and rear trucks, each comprising front and rear sets of wheels, of a bolster pivoted on an intermediate portion of the rear truck, a bolster support mounted on the front truck, a bolster mounted on said bolster support, a coupling comprising slidably associated sections, pivotal connections between one of the sections and the front portion of the rear truck, means for holding the sections against their sliding movement, another swinging section having a pivotal connection with the other of the sliding sections, said swinging section extending beneath the bolster support of the front truck, and a pivot pin passing through the bolster of the front truck, the bolster support and said swinging sections.

10. In a vehicle of the character described, the combination with front and rear trucks, of a coupling between them comprising slidably associated sections, a sleeve surrounding the sections, braces connecting the sleeve and one truck, and a device connecting the sleeve and one of the coupling sections to prevent its sliding movement thereon, said device also engaging the braces to secure them to the coupling.

11. In a vehicle of the character described, the combination with front and rear trucks, of a coupling between them comprising slidably associated sections connected respectively to the trucks, a sleeve surrounding the sections, braces between the rear truck and the sleeve, and a fastener connecting the braces, the sleeve and the coupling section that is connected to the rear truck.

12. In a vehicle of the character described, a truck comprising front and rear axles, and axle bolster located over the front axle, standards located between said axle and bolster, separating them, fasteners connecting the bolster and axle and passing downwardly through the standards, a truck hound frame secured to the rear axle and extending between the front axle and axle bolster, and draft devices for the truck connected to the standards.

13. In a vehicle of the character described, a truck comprising front and rear axles, an axle bolster mounted over the front axle, standards separate from said axle and bolster and located between them, separating them, said standards having forwardly projecting ears, bolts passing downwardly through the bolster, the standards and axle, a truck hound frame secured to the rear axle and extending between the front axle and axle bolster and between the standards, and draft devices for the truck, connected to the ears of the standards.

14. In a vehicle of the character described, the combination with a truck frame including front and rear axles, side bars, and a bolster support resting on the side bars, of a bolster pivoted on the support between the side bars, and separate curved tracks for the bolster disposed over the side bars and over the bolster support, said tracks being disposed beneath the bolster and having their front ends secured to the side bars and their rear ends to the rear axle.

15. In a vehicle of the character described, the combination with spaced trucks, each comprising front and rear axles, an axle bolster disposed over the front axle, a truck hound frame secured to the rear axle and having its front end movably disposed between the front axle and axle bolster, and standards separating the front axle and axle bolster, of draft mechanism connected to the standards of the front truck, a coupling connected to the standards of the rear truck and including a swinging member that extends to an intermediate portion of the front truck, bolster supports mounted on the truck hound frame, the bolster support of the front truck being disposed over the coupling section, bolsters pivotally mounted on the supports, a pivot pin passing through the front bolster, through its truck support and the section of the coupling disposed beneath said support, and curved tracks for the bolster extending over the bolster supports and beneath the bolsters.

16. In a vehicle of the character described, the combination with a truck having front and rear sets of wheels, a frame, a bolster support mounted on the frame and having a groove in its under side, and a bolster mounted on the upper side of the support, of a rock shaft journaled in the groove of the bolster support and having depending arms, a brake beam mounted on the arms and having shoes coacting with certain of the wheels, and means for operating the beam.

17. In a vehicle of the character described, the combination with front and rear trucks, of a coupling connecting the trucks, and including slidably associated sections, a divided cuff surrounding the sections and comprising sections having overlapped oppositely disposed ends, and a holding pin passing through the overlapped ends and the sections of the coupling to secure the cuff against separation and prevent relative and sliding movements of the coupling sections.

18. In a vehicle of the character described, a truck frame comprising spaced axles, a frame rigidly fixed to the rear axle and having a movable engagement with the front axle, a pivotal connection between the front axle and the frame that is located in rear of said front axle, a bolster supporting beam mounted transversely on the frame between the axles and disposed in substantially parallel relation to said axles, a bolster pivotally mounted between its ends on the bolster supporting beam, and curved tracks for the bolster, mounted on the truck frame and extending between the bolster supporting beam and the bolster, said tracks extending on opposite sides of said beam and having their front ends terminating short of the front axle
5 and secured to the frame in rear of said front axle.

In testimony, that I claim the foregoing as my own, I have hereto affixed my signature in the presence of two witnesses.

RANDOLPH N. MARTZ.

Witnesses:
A. L. McGavack,
J. T. McGavack.